United States Patent
Vilar et al.

(10) Patent No.: US 11,572,672 B2
(45) Date of Patent: Feb. 7, 2023

(54) METHOD TO DECOUPLE ENGINE SPEED FROM HYDRAULIC PUMP SPEED THROUGH AN ELECTRIC MOTOR DRIVEN VARIATOR

(71) Applicant: Deere & Company, Moline, IL (US)

(72) Inventors: Eric Vilar, Dubuque, IA (US); Jonathan Coulter, Glenpool, OK (US)

(73) Assignee: Deere & Company, Moline, IL (US)

( * ) Notice: Subject to any disclaimer, the term of this patent is extended or adjusted under 35 U.S.C. 154(b) by 432 days.

(21) Appl. No.: 16/797,074

(22) Filed: Feb. 21, 2020

(65) Prior Publication Data

US 2021/0262197 A1 Aug. 26, 2021

(51) Int. Cl.
*E02F 9/20* (2006.01)
*B60W 10/30* (2006.01)
*B60W 10/08* (2006.01)
*E02F 9/22* (2006.01)

(52) U.S. Cl.
CPC ........... *E02F 9/2075* (2013.01); *B60W 10/08* (2013.01); *B60W 10/30* (2013.01); *E02F 9/2296* (2013.01); *B60L 2200/40* (2013.01); *B60W 2300/17* (2013.01); *F15B 2211/20515* (2013.01); *F16H 2200/2007* (2013.01)

(58) Field of Classification Search
CPC ..... E02F 9/2075; E02F 9/2296; B60W 10/08; B60W 10/30; B60W 2300/17; B60L 2200/40; F15B 2211/20515; F16H 2200/2007
See application file for complete search history.

(56) References Cited

U.S. PATENT DOCUMENTS

| | | | | |
|---|---|---|---|---|
| 9,637,890 B2 * | 5/2017 | Hirozawa | ........... | B60W 10/103 |
| 2003/0162619 A1 * | 8/2003 | Rodeghiero | ........... | B60K 17/28 |
| | | | | 475/73 |
| 2011/0273141 A1 * | 11/2011 | Kanbayashi | ............. | B66F 9/20 |
| | | | | 320/134 |
| 2012/0109472 A1 | 5/2012 | Yanagisawa | | |
| 2013/0137543 A1 * | 5/2013 | Mattsson | .................. | F16H 3/72 |
| | | | | 475/204 |
| 2014/0062075 A1 * | 3/2014 | Tsuchihashi | ........... | A01D 34/82 |
| | | | | 280/779 |
| 2014/0148984 A1 * | 5/2014 | Nishi | .................... | B60W 20/19 |
| | | | | 180/65.265 |

(Continued)

FOREIGN PATENT DOCUMENTS

| | | |
|---|---|---|
| DE | 202011107327 U1 | 2/2012 |
| JP | 2003009308 A | 1/2003 |
| WO | WO2011081593 A1 | 7/2011 |

OTHER PUBLICATIONS

German Search Report issued in application No. DE102021200488.1 dated Nov. 9, 2021 (04 pages).

*Primary Examiner* — Colby M Hansen
(74) *Attorney, Agent, or Firm* — Lucian Wayne Beavers; Patterson Intellectual Property Law, PC

(57) ABSTRACT

A work machine includes an engine for driving a primary working unit. At least one hydraulically powered auxiliary working unit is powered by a hydraulic pump. The engine and an electric motor both provide power to the hydraulic pump via a planetary gear set which sums the power inputs from the engine and the electric motor. The pump speed of the hydraulic pump is thereby decoupled from the engine speed of the engine.

20 Claims, 6 Drawing Sheets

(56) References Cited

U.S. PATENT DOCUMENTS

| | | | |
|---|---|---|---|
| 2014/0187381 A1* | 7/2014 | Dix | F16H 61/4157 |
| | | | 477/94 |
| 2015/0090506 A1 | 4/2015 | Hirozawa | |
| 2016/0053782 A1* | 2/2016 | Fliearman | B60K 25/02 |
| | | | 60/413 |
| 2017/0284517 A1 | 10/2017 | Rekow et al. | |
| 2018/0023671 A1* | 1/2018 | Watt | A01D 69/06 |
| | | | 74/15.4 |
| 2018/0149247 A1 | 5/2018 | Rekow et al. | |
| 2018/0195254 A1* | 7/2018 | Yun | E02F 9/2285 |
| 2018/0238443 A1* | 8/2018 | Aulin | B60K 6/485 |

* cited by examiner

METHOD TO DECOUPLE ENGINE SPEED FROM HYDRAULIC PUMP SPEED THROUGH AN ELECTRIC MOTOR DRIVEN VARIATOR

FIELD OF THE DISCLOSURE

The present disclosure relates to work machines of the type having a primary working unit driven by an engine and having a hydraulically powered auxiliary working unit.

BACKGROUND

Work machines of this type may for example include wheeled loaders, backhoes, skid steer machines, and other machines in which the hydraulically powered auxiliary working unit is capable of heavily loading the engine and may be used simultaneously while accelerating or decelerating the drive train of the machine.

In the example of a wheeled loader, the primary working unit may be the wheels which propel the wheeled loader across a ground surface, and the hydraulically powered auxiliary working unit may include the lifting arm which lifts a bucket or fork for engaging loads to be lifted, moved and unloaded by the wheeled loader. Traditionally the wheeled loader includes a hydraulic pump driven by the engine to generate the hydraulic power for the hydraulically powered auxiliary working unit. With such an arrangement, if additional hydraulic power is needed the engine speed is increased to increase the speed of the hydraulic pump and thus increase the hydraulic power available to the auxiliary working unit.

One disadvantage of such an arrangement is that the engine speed necessary to provide the needed hydraulic power may be higher than is currently needed to power the primary working unit, thus leading to inefficient operation of the engine.

SUMMARY OF THE DISCLOSURE

The current disclosure provides improvements in the construction and operation of work machines which allows the speed of the hydraulic pump to be decoupled from the engine speed, thus allowing for more efficient engine operation.

In one embodiment a work machine may include an engine, a primary working unit, and a drive train configured to transmit power from the engine to the primary working unit. The work machine may include at least one hydraulically powered auxiliary working unit, and a hydraulic pump configured to power the at least one hydraulically powered auxiliary working unit. The work machine may include an electric motor and a planetary gear set. The planetary gear set may include a first power input connected to the engine, a second power input connected to the electric motor, and a power output connected to the hydraulic pump.

In another embodiment a method is provided of controlling such a work machine. The method may include steps of:
 (a) providing a first power input to a planetary gear set with the engine;
 (b) providing a second power input to the planetary gear set with the electric motor; and
 (c) summing the first power input and the second power input with the planetary gear set and providing a power output from the planetary gear set to the hydraulic pump.

Numerous objects, features and advantages of the embodiments set forth herein will be readily apparent to those skilled in the art upon reading of the following disclosure when taken in conjunction with the accompanying drawings.

DETAILED DESCRIPTION

Figure 1:
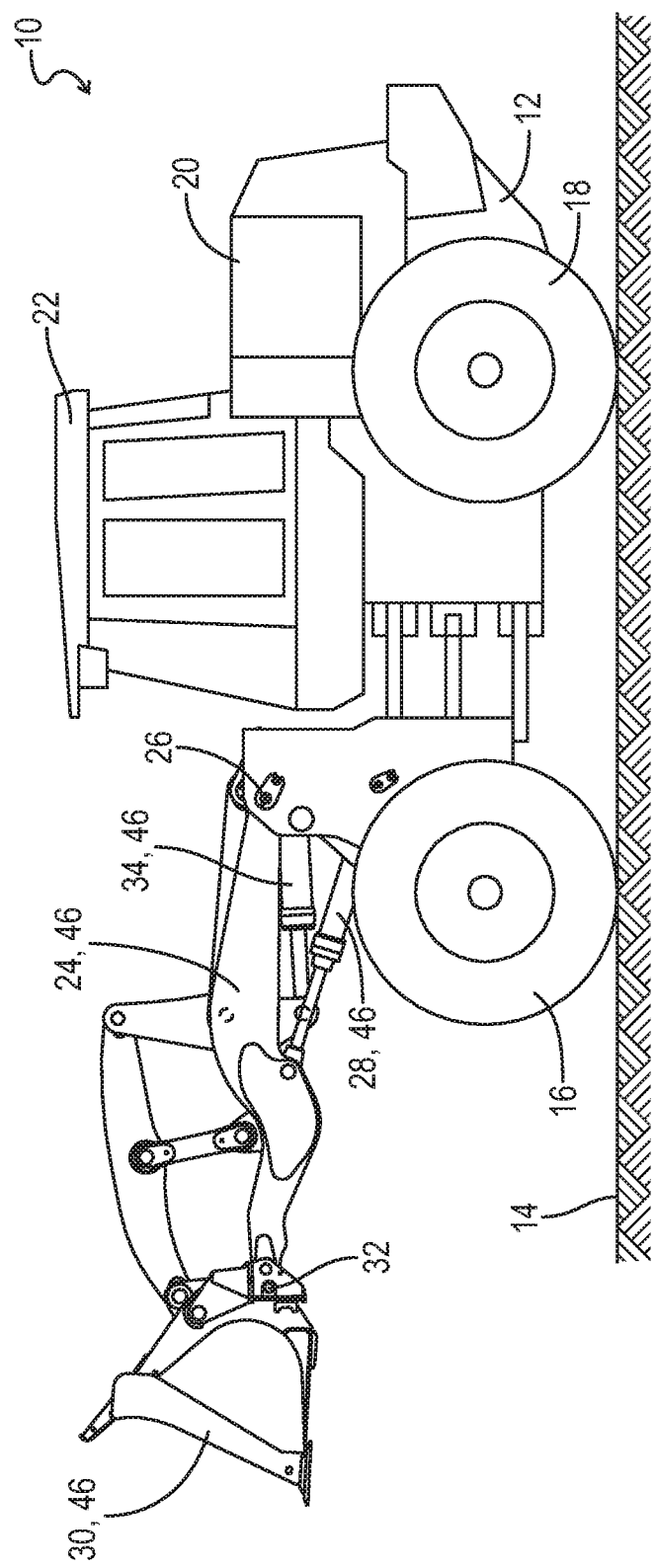
FIG. 1 is a side elevation view of a work machine in the form of a wheeled loader.

Referring now to the drawings and particularly to FIG. 1, a work machine is shown in side elevation view and generally designated by the number 10. FIG. 1 shows a wheeled loader machine 10. The systems disclosed herein are applicable to wheeled loaders, backhoes, skid steer machines, and other working machines of the type having a primary working unit driven by the engine and having a hydraulically powered auxiliary working unit. The systems are particularly useful with work machines in which the hydraulically powered auxiliary working unit is capable of heavily loading the engine and may be used simultaneously while accelerating or decelerating the drive train of the machine. In one embodiment each of the primary working unit and the hydraulically powered auxiliary working unit may be capable of fully loading the engine.

The work machine 10 includes an machine frame 12 supported from a ground surface 14 by front and rear ground engaging units 16 and 18. The ground engaging units 16 and 18 illustrated are wheeled ground engaging units, but it will be understood that tracked ground engaging units may also be used.

An engine 20, which may for example be a diesel powered internal combustion engine, is supported from the machine frame 12. An operator's cab 22 may be located on the machine frame 12 in front of the engine 20. A lifting arm 24 is pivotally supported from the machine frame 12 at pivot 26, and hydraulic lifting cylinders 28 and 29 are connected between the machine frame 12 and the lifting arm 24 for pivoting the lifting arm 24 up and down about pivot 26. A work implement 30, which may for example be a bucket or a fork, is pivotally attached to the lifting arm 24 at a second pivot 32, and is pivoted relative to the lifting arm 24 by a hydraulic pivot cylinder 34.

In operation the work machine 10 will engage various loads with the work implement 30, lift the loads, transport the loads across the ground surface to a second location, and unload the loads. As is further shown schematically in FIGS.

2 and 3, the engine 20 may provide a direct mechanical drive to the ground engaging units 16, 18 via a drive train 36.

The drive train 36 may for example include a transmission 40, front axles 42 and rear axles 44. The front axles 42 may drive front wheels 16. The rear axles 44 may drive rear wheels 18. The transmission 40 is configured to transmit power from the engine 20 to the drive wheels at multiple transmission ratios.

In the embodiment of the work machine 10 as a wheeled loader, one or more of the front and rear ground engaging units 16, 18 may be described as a primary working unit 19, and the drive train 36 may be described as being configured to transmit power from the engine 20 to the primary working unit 19 to propel the work machine 10 over the ground surface 14.

In the embodiment of the work machine 10 as a wheeled loader, the lifting arm 24, work implement 30, and the associated hydraulic lift cylinders 28 and 29 and hydraulic pivot cylinder 34 may be collectively referred to as a hydraulically powered auxiliary working unit 46.

Figure 2:
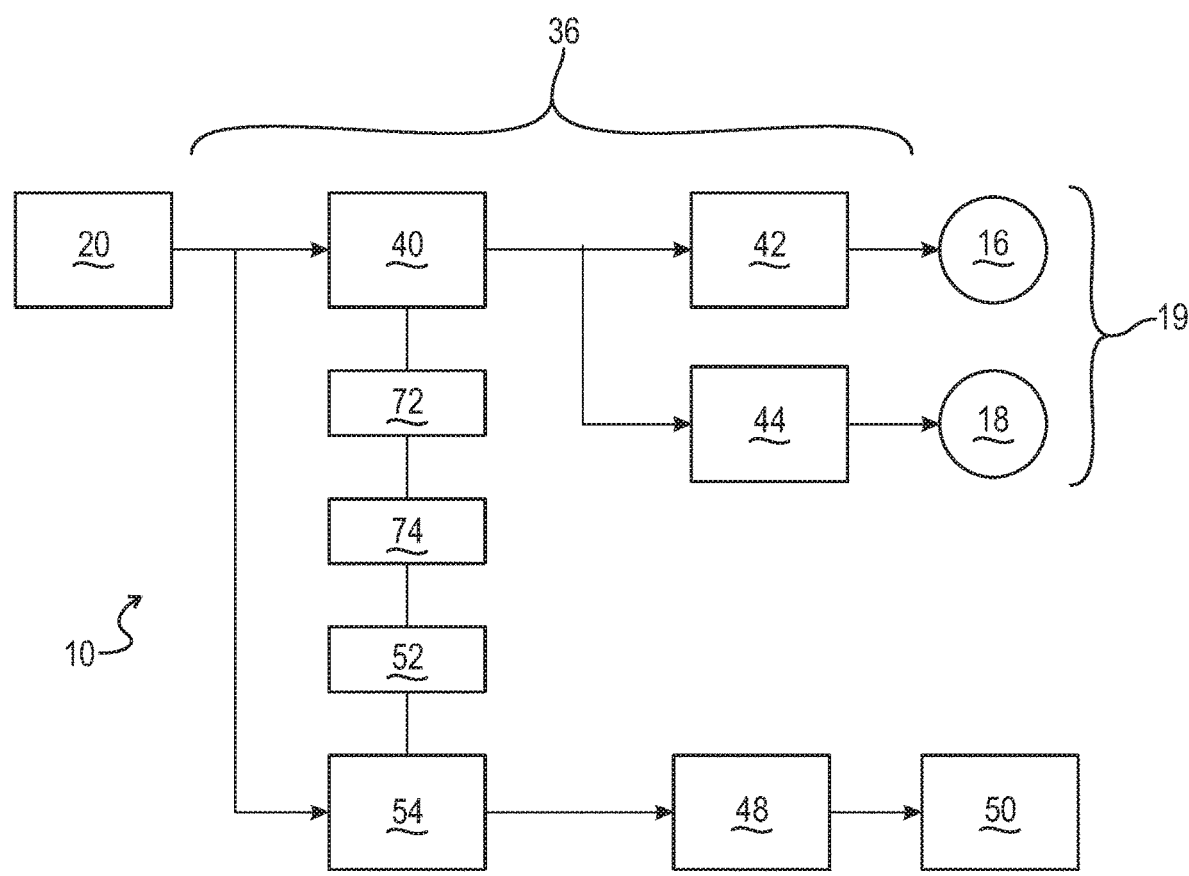
FIG. 2 is a schematic illustration of a first embodiment of the work machine of FIG. 1, wherein electrical power for the electric motor is provided by an electrical generator driven by the transmission of the work machine.
Figure 3:
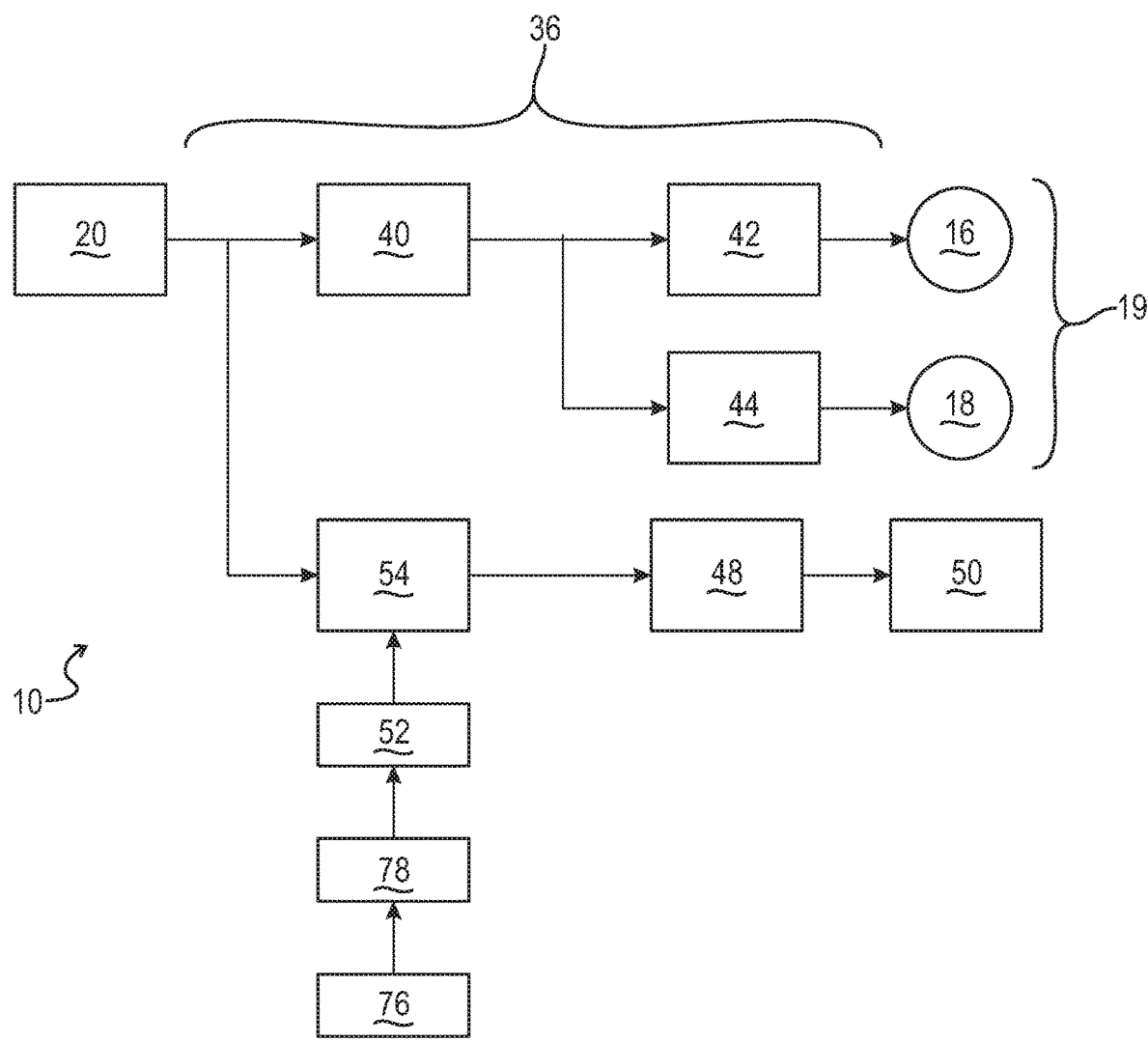
FIG. 3 is a schematic illustration of a second embodiment of the work machine of FIG. 1, wherein electrical power for the electric motor is provided by a battery carried by the work machine.
Figure 7:
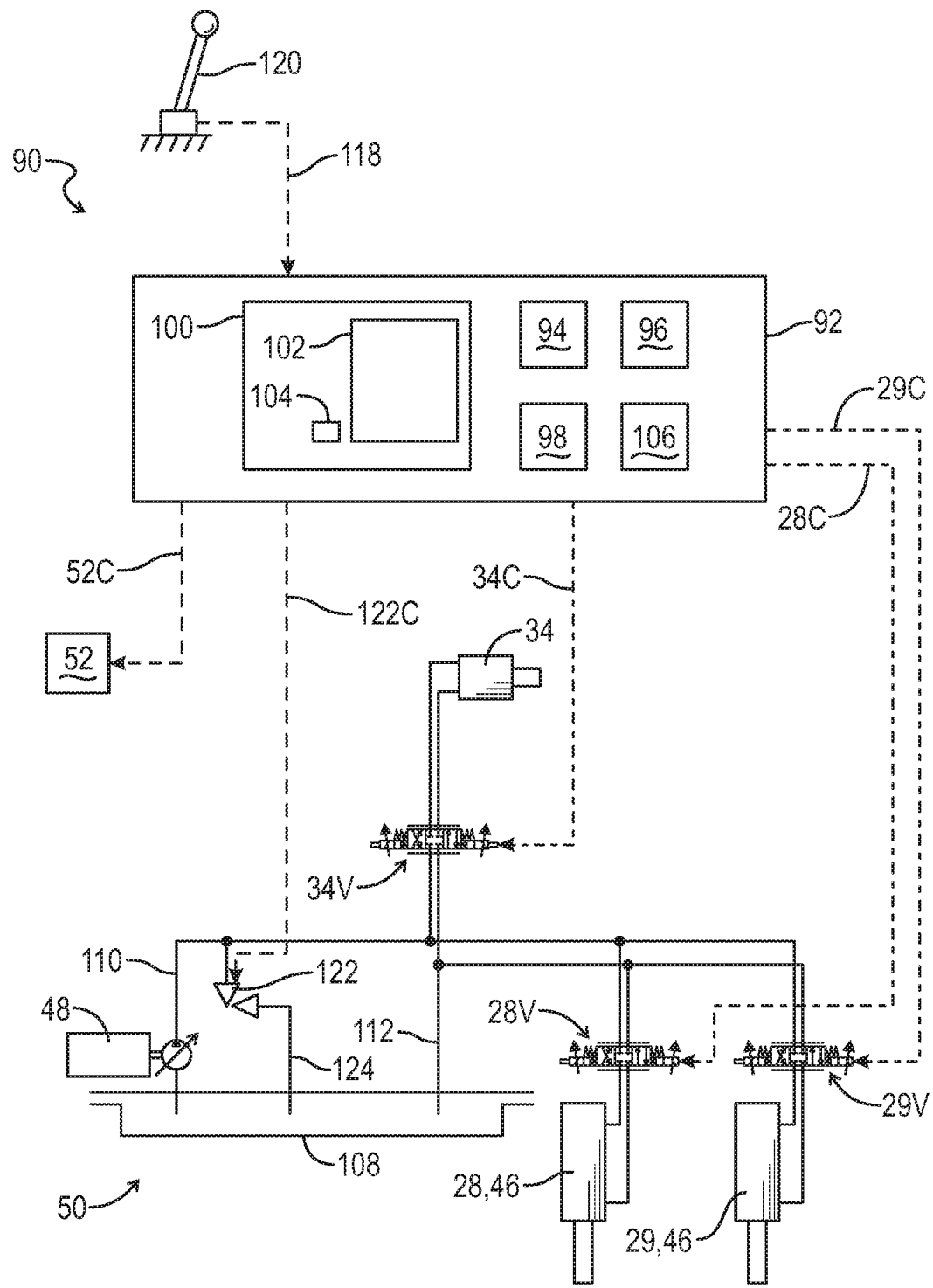
FIG. 7 is a schematic illustration of a controller for the work machine and the associated inputs and outputs.

As is schematically illustrated in FIGS. 2, 3 and 7, a hydraulic pump 48 provides hydraulic power to a hydraulic system 50 which may power the hydraulically powered auxiliary working unit 46 and other hydraulic components of the work machine 10.

The work machine 10 may also include an electric motor 52. The present disclosure provides a system which combines power inputs from the engine 20 and the electric motor 52 to power the hydraulic pump 48. The primary power source may be the engine 20, and the electric motor 52 may be used to provide additional power as needed so as to control the power directed to the hydraulic pump 48 in a manner other than simply changing the speed of the engine 20. This decouples the pump speed of the hydraulic pump 48 from the engine speed of the engine 20. This combination of power inputs is achieved with a planetary gear set 54.

Figure 4:
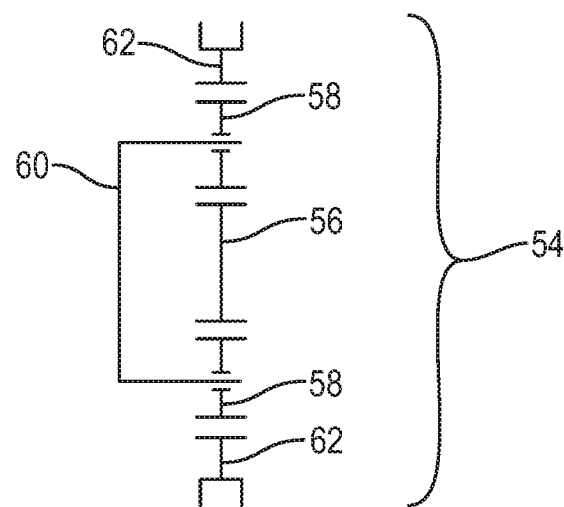
FIG. 4 is a schematic illustration of a planetary gear set.
Figure 5:
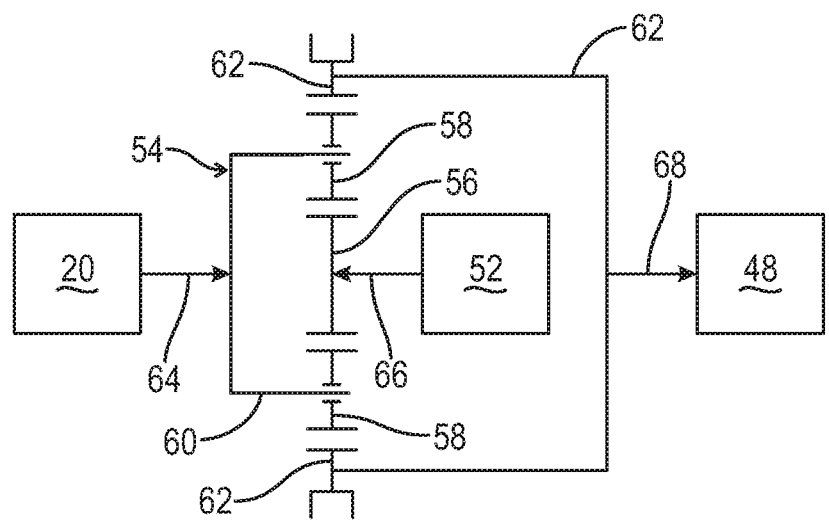
FIG. 5 is a schematic illustration of the planetary gear set of FIG. 4 connected to the engine, the motor and the hydraulic pump of the work machine of FIG. 1.

As schematically illustrated in FIG. 4, the planetary gear set 54 includes a sun gear 56, a plurality of planet gears 58 connected to a carrier 60, and a ring gear 62. The planet gears 58 engage the sun gear 56 and are movable around the sun gear 56. The ring gear 62 surrounds and engages the planet gears 56 and is rotatable around the planet gears 58 and the sun gear 56. As is further schematically illustrated in FIG. 5, the engine 20 may be connected to the carrier 60 to define a first power input 64 schematically represented by the arrow numbered 64. The electric motor 52 may be connected to the sun gear 56 to define a second power input 66 schematically represented by the arrow numbered 66. The ring gear 62 may be connected to the hydraulic pump 48 to define a power output 68 schematically represented by the arrow numbered 68.

The electric motor 52 driving the sun gear 56 functions as a variator to adjust the power output 68 and thus adjust the pump speed of the hydraulic pump 48.

As is further explained below the planetary gear set 54 is configured to sum the first power input 64 from the engine 20 and the second power input 66 from the electric motor 52 to drive the hydraulic pump 48. As is further explained below this allows a pump speed of the hydraulic pump 48 to be controlled by controlling a motor speed of the electric motor 52.

In the embodiment of FIG. 2 the transmission 40 may drive an electrical power generator 72 to generate DC electric power. A power inverter 74 may convert the DC power to AC power which is directed to the electric motor 52 which may be an AC powered electric motor. The DC power may also be drawn from a power bus associated with the transmission 40, which as further explained below may be an eIVT transmission.

In the alternative embodiment of FIG. 3 the work machine 10 may include a battery 76, and DC electric power from battery 76 may be passed through a power conversion device 78 which converts DC to AC power to drive the electric motor 52. The battery 76 may be recharged by reverse operation of the electric motor 52. The power conversion device 78 may be a bi-directional device. The power conversion device 78 may also comprise parallel inverter and rectifier channels so that DC power flowing from the battery 76 is inverted to create AC power for the electric motor 52, and so that AC power flowing from the motor 52 in reverse operation is rectified for storage in battery 52.

In one embodiment the battery 76 may be sized similar to that currently used in a hybrid car, where the battery is expected to be recharged between periods of maximum hydraulic demand. In another embodiment the battery 76 may be larger, similar to those currently used in plug-in hybrid cars, and the battery may be sized to perform multiple hydraulic operations without recharging between periods of maximum hydraulic demand.

The transmission 40 may be an electronic infinitely variable transmission (eIVT) such as disclosed for example in U.S. Patent Application Publication No. 2018/0149247 to Rekow et al., the details of which are incorporated herein by reference.

Figure 6:
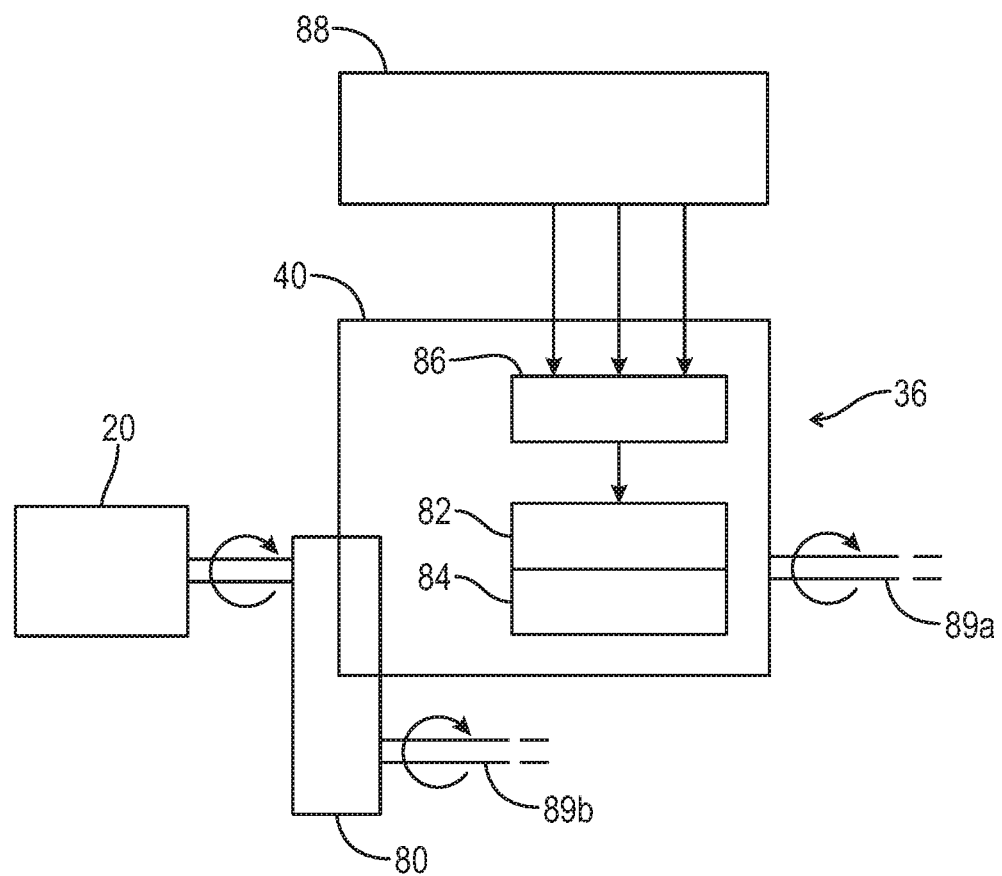
FIG. 6 is a schematic illustration of the drive train of the work machine of FIG. 1 including an eIVT transmission.

Referring now to FIG. 6, various components of the drive train 36 are depicted. For example, the engine 20 may provide mechanical power (e.g., via a rotating shaft) to the transmission 40 which may be in the form of an eIVT. The engine 20 may also provide mechanical power to an infinitely variable power (IVP) machine 80, which may include one or more IVP machines (e.g., an electric motor and generator, or hydrostatic machine having a hydrostatic motor and associated pump). The transmission 40 may additionally receive mechanical power from the IVP 80.

The transmission 40 may include various clutches 82 and brakes 84, which may be controlled by various actuators 86. The actuators 86, in turn, may be controlled by a transmission control unit ("TCU") 88 (or another controller), which may receive various inputs from various sensors or devices (not shown) via a CAN bus (not shown) of the work machine 10. The transmission 40 may include one or more output shafts 89a, 89b for transmission of mechanical power from the transmission 40 to various other components (e.g., a differential drive shaft). In certain embodiments, additional gear sets (e.g., a set of range gears) may be interposed between the transmission 40 and other parts of the work machine 10 (e.g., a differential drive shaft). In certain embodiments, the transmission 40 may also provide power directly to other parts of the work machine 10 (e.g., via direct drive shaft 89b).

The Control System of FIG. 7

As schematically illustrated in FIG. 7, the work machine 10 includes a control system 90 including a controller 92. The controller 92 may be part of the transmission control unit 88 of the transmission 40, or part of another machine controller of the work machine 10, or it may be a separate control module. In any event the controller 92 may work in coordination with the transmission control unit 88, so that the engine speed of the engine 20 is set by transmission control unit 88 based primarily upon the engine speed needed to power the drive train making up the primary working unit 19, and so that the controller 92 controls the motor speed of electric motor 52 to control the pump speed of the hydraulic pump 48 and thus the hydraulic power provided to the hydraulic components making up the hydraulically powered auxiliary working unit 46. The controller 92 may be mounted in the operator's cab 22 at a control panel.

The controller 92 is configured to receive an input signal 118 from a hydraulic systems control input 120 located at the operator's station 22. Control input 120 may for example be a joystick control 120 for operating the lifting arm 24 and the work implement 30. Typically, such a joystick control 120 may be pulled back or pushed forward to raise or lower the lifting arm 24, respectively. The joystick control 120 may be moved left or right to rotate the work implement 30 relative to the lifting arm 24. Position sensors integrated in the joystick control 120 generate the input signals 118 transmitted to the controller 92. Algorithms contained in software in the controller 92 can then determine the power needed by the hydraulic system and the corresponding motor speed needed for the electric motor 52 to provide the needed power to the hydraulic pump 48.

The controller 92 will generate control signals such as 52C directed to the electric motor 52 to control the motor speed.

The controller 92 will also generate control signals such as 28C, 29C and 34C for controlling the operation of the various hydraulic actuators, which control signals are indicated schematically in FIG. 7 by phantom lines connecting the controller 92 to the various actuators with the arrow indicating the flow of the command signal from the controller 92 to the respective actuator. It will be understood that the various actuators such as 28, 29 and 34 as disclosed herein may be hydraulic piston-cylinder units and that the electronic control signals from the controller 92 will actually be received by electro-hydraulic control valves associated with the actuators and the electro-hydraulic control valves will control the flow of hydraulic fluid to and from the respective hydraulic actuators to control the actuation thereof in response to the control signal from the controller 92.

The control signals 28C and 29C (see FIG. 7) sent to the lift cylinders 28 and 29 cause the lift cylinders 28 and 29 to extend or retract in response to the input signals 118 from joystick control 120 to raise and lower lifting arm 24. Control signal 34C (see FIG. 4), sent to the pivot cylinder 34 controls the pivoting of work implement 30 relative to lifting arm 24. The control signals are generated at least in part in response to the input signals 118.

Controller 92 includes or may be associated with a processor 94, a computer readable medium 96, a data base 98 and an input/output module or control panel 100 having a display 102. An input/output device 104, such as a keyboard, joystick or other user interface, is provided so that the human operator may input instructions to the controller. The input/output device 104 may include the joystick control 120 discussed above. It is understood that the controller 92 described herein may be a single controller having all of the described functionality, or it may include multiple controllers wherein the described functionality is distributed among the multiple controllers.

Various operations, steps or algorithms as described in connection with the controller 92 can be embodied directly in hardware, in a computer program product 106 such as a software module executed by the processor 94, or in a combination of the two. The computer program product 106 can reside in RAM memory, flash memory, ROM memory, EPROM memory, EEPROM memory, registers, hard disk, a removable disk, or any other form of computer-readable medium 96 known in the art. An exemplary computer-readable medium 96 can be coupled to the processor 94 such that the processor can read information from, and write information to, the memory/storage medium. In the alternative, the medium can be integral to the processor. The processor and the medium can reside in an application specific integrated circuit (ASIC). The ASIC can reside in a user terminal. In the alternative, the processor and the medium can reside as discrete components in a user terminal.

The term "processor" as used herein may refer to at least general-purpose or specific-purpose processing devices and/or logic as may be understood by one of skill in the art, including but not limited to a microprocessor, a microcontroller, a state machine, and the like. A processor can also be implemented as a combination of computing devices, e.g., a combination of a DSP and a microprocessor, a plurality of microprocessors, one or more microprocessors in conjunction with a DSP core, or any other such configuration.

In FIG. 7 the hydraulic fluid supply system 50 is also further schematically illustrated, including the previously mentioned hydraulic pump 48. Pump 48 takes hydraulic fluid from a tank 108 and provides pressurized hydraulic fluid to hydraulic fluid supply line 110. Supply line 110 is connected to a first inlet of each of the electro-hydraulic direction and flow rate control valves 28V, 29V and 34V associated first and second lift cylinders 28 and 29 and the pivot cylinder 34.

The hydraulic fluid supply system 50 may include a pressure relief valve 122 to control the pressure within the hydraulic fluid supply system 50. Discharge from pressure relief valve 122 flows back to tank 108 via return line 124. The pressure relief valve 122 may be an adjustable valve which is adjusted via a command signal 122C from the controller 92.

Each of the valves 28V, 29V and 34V is shown as a three position valve having a center position where there is no flow through the valve, a left side position wherein fluid flows to a first outlet port, and right side position wherein fluid flows to a second outlet port. The hydraulic fluid from each control valve flows to its respective hydraulic cylinder in the selected direction. Return fluid from the hydraulic cylinders flows back through the respective control valve to a return line 112 which returns the hydraulic fluid to tank 108.

Each of the valves 28V, 29V and 34V may be a proportional control valve wherein in addition to controlling the direction of flow, the valve controls the rate of flow of hydraulic fluid, all in response to the control signals received from the controller 92. Alternatively, each of the hydraulic cylinders may have separate flow direction control valves and flow rate control valves associated therewith.

It will be understood that the two valves 28V and 29V may be combined into a single valve providing a split output to the two hydraulic cylinders 28 and 29 so that those cylinders are operated in tandem.

The operation of the work machine 10 may be generally described as follows. The human operator will be directing two operations that each may put substantial power demands on the machine. The first operation, which has been referred to in this disclosure as operation of a primary working unit 19 may for example be directing the motion of the work machine 10 across the ground surface as propelled by the front and rear wheels 16 and 18. This operation may be directed by a throttle control manually operated by the human operator. The transmission control unit 88 of the eIVT transmission 40 may, in response to that throttle position, set the engine speed of engine 20 at a preferred speed for efficient engine operation. The second operation, which has been referred to in this disclosure as operation of an auxiliary working unit 46, may for example be directing the operation of the lifting arm 24 and work implement 30 via the hydraulic cylinders 28, 29 and 34. This second operation may be directed by the joystick control 120 previously described. The controller 92 may, in response to the input signals 118 from joystick control 120, set the motor speed of the electric motor 52. The controller 92 may also adjust the maximum hydraulic pressure within the hydraulic supply system 50 by adjusting the relief valve 122. A further specific example of such operation is given below.

Example

The work machine 10 may be a wheel loader and the planetary gear set 54 may include a sun gear 56 having twenty teeth and a ring gear 62 having seventy teeth. This planetary gear set may provide a speed ratio of −0.287 for sun gear in, ring gear out, and carrier fixed. This planetary gear set may provide a speed ratio of 1.287 for carrier in, ring gear out, and sun gear fixed. The input power from the engine 10, input power from the electric motor 52, and output power to the hydraulic pump 48 under various operating conditions is shown in the following tables.

Table I illustrates power flows when the hydraulic pump 48 is on standby and the battery 76 is not being charged. In the tables negative "Power" numbers indicate power flowing out of (i.e. being generated by) the designated component and positive "Power" numbers indicate power flowing into the designated component. Thus the "Power" of the electric motor 52 is a positive number if the electric motor 52 is functioning as a generator and is a negative number if the electric motor is functioning as a motor. The "Power" of the engine 20 is always a negative number and the "Power" of the hydraulic pump 48 is always a positive number.

| Pump Standby, Not Charging | | | |
|---|---|---|---|
| | Speeds (rpm) | Torque (Nm) | Power (kW) |
| Drivetrain Requesting Idle Engine Speed | | | |
| Motor (Sun) | 0 | 11 | 0.0 |
| Engine (Carrier) | 800 | −51 | −4.3 |
| Pump (Ring) | 1,029 | 40 | 4.3 |
| Drivetrain Requesting Max Engine Speed | | | |
| Motor (Sun) | 1,000 | 11 | 1.2 |
| Engine (Carrier) | 1,900 | −51 | −10.2 |
| Pump (Ring) | 2,158 | 40 | 9.0 |

Table II illustrates power flows when the hydraulic pump 48 is on standby and the battery 76 is being charged. In this example the engine 20 is being driven at various engine speeds as directed by the transmission control unit 88 to provide the power needed to propel the work machine 10 over the ground surface. Excess power available from the engine is used to charge the battery.

| Pump Standby, Charging | | | |
|---|---|---|---|
| | Speeds (rpm) | Torque (Nm) | Power (kW) |
| Drivetrain Requesting Idle Engine Speed | | | |
| Motor (Sun) | 2,450 | 32 | 8.2 |
| Engine (Carrier) | 800 | −144 | −12.1 |
| Pump (Ring) | 327 | 112 | 3.8 |
| Drivetrain Requesting Low Engine Speed | | | |
| Motor (Sun) | 4,245 | 32 | 14.25 |
| Engine (Carrier) | 1,200 | −144 | −18.1 |
| Pump (Ring) | 327 | 112 | 3.8 |
| Drivetrain Requesting Max Engine Speed Below 35 kph | | | |
| Motor (Sun) | 5,592 | 32 | 18.8 |
| Engine (Carrier) | 1,500 | −144 | −22.6 |
| Pump (Ring) | 327 | 112 | 3.8 |
| Drivetrain Requesting Max Engine Speed at Max Transport Speed | | | |
| Motor (Sun) | 7,387 | 32 | 24.8 |
| Engine (Carrier) | 1,900 | −144 | −28.6 |
| Pump (Ring) | 327 | 112 | 3.8 |

Table III illustrates power flows when the hydraulic pump 48 is running at maximum hydraulic power output and the battery 76 is discharging to power the electric motor 52. In this example the engine 20 is being driven at various engine speeds as directed by the transmission control unit 88 to provide the power needed to propel the work machine 10 over the ground surface. Simultaneously there is a substantial power demand from the hydraulic system. That demand is met to the extent possible by the engine 20, and whatever additional power is needed is provided by the electric motor 52. It is noted that in this example the engine 20 and the electric motor 52 are configured such that a maximum value of the power input from the engine 20 is greater than a maximum value of the power input from the electric motor 52.

| Max Hydraulics, Discharging | | | |
|---|---|---|---|
| | Speeds (rpm) | Torque (Nm) | Power (kW) |
| Drivetrain Requesting Max Engine Speed | | | |
| Motor (Sun) | 454 | 456 | 21.7 |
| Engine (Carrier) | 1,500 | −2,047 | −321.6 |
| Pump (Ring) | 1,800 | 1,591 | 299.9 |
| Drivetrain Requesting Low Engine Speed | | | |
| Motor (Sun) | −893 | 456 | −42.6 |
| Engine (Carrier) | 1,200 | −2,047 | −257.3 |
| Pump (Ring) | 1,800 | 1,591 | 299.9 |
| Drivetrain Requesting Idle Engine Speed | | | |
| Motor (Sun) | −2,688 | 456 | −128.4 |
| Engine (Carrier) | 800 | −2,047 | −171.5 |
| Pump (Ring) | 1,800 | 1,591 | 299.9 |

Methods of Operation

One method of operation of the work machine 10 may include steps of:
(a) providing a first power input 64 to a planetary gear set 54 with the engine 20; and
(b) providing a second power input 66 to the planetary gear set 54 with the electric motor 52; and
(c) summing the first power input 64 and the second power input 66 with the planetary gear set 54 and providing a power output 68 from the planetary gear set 54 to the hydraulic pump 48.

The method may further include controlling a pump speed of the hydraulic pump 48 by controlling a motor speed of the electric motor 52. The controlling step may be performed with the automatic controller 92.

The method may further include:

generating electric power with the electrical generator 72 driven by the drive train 36; and providing the electric power from the electrical generator 72 to the electric motor 52.

The method may further include providing electric power to the electric motor 52 from the battery 76 carried by the work machine 10.

Thus, it is seen that the apparatus and methods of the present disclosure readily achieve the ends and advantages mentioned as well as those inherent therein. While certain preferred embodiments of the disclosure have been illustrated and described for present purposes, numerous changes in the arrangement and construction of parts and steps may be made by those skilled in the art, which changes are encompassed within the scope and spirit of the present disclosure as defined by the appended claims. Each disclosed feature or embodiment may be combined with any of the other disclosed features or embodiments.

What is claimed is:

1. A work machine, comprising:
an engine;
a primary working unit;
a drive train configured to transmit power from the engine to the primary working unit;
at least one hydraulically powered auxiliary working unit;
a hydraulic pump configured to power the at least one hydraulically powered auxiliary working unit;
an electric motor; and
a planetary gearset including a first power input connected to the engine, a second power input connected to the electric motor, and a power output connected to the hydraulic pump.

2. The work machine of claim 1, wherein:
the planetary gearset is configured to sum the first power input from the engine and the second power input from the electric motor to drive the hydraulic pump so that a pump speed of the hydraulic pump can be controlled by controlling a motor speed of the electric motor.

3. The work machine of claim 1, further comprising:
a controller configured to control a pump speed of the hydraulic pump by controlling a motor speed of the electric motor.

4. The work machine of claim 1, further comprising:
an electrical power generator operably connected to the drive train and configured to generate electrical power; and
wherein the electric motor is connected to the electrical power generator for receiving electrical power from the electrical power generator.

5. The work machine of claim 4, wherein:
the drive train includes a transmission configured to transmit power from the engine to the primary working unit at multiple transmission ratios; and
the electrical power generator is driven from the transmission.

6. The work machine of claim 5, further comprising:
a controller configured to control a pump speed of the hydraulic pump by controlling a motor speed of the electric motor, wherein the controller is a part of a transmission control unit of the transmission.

7. The work machine of claim 1, further comprising:
a battery; and
wherein the electric motor is connected to the battery for receiving electrical power from the battery.

8. The work machine of claim 7, further comprising:
a DC to AC inverter connecting the battery to the electric motor.

9. The work machine of claim 7, further comprising:
a controller configured to control a pump speed of the hydraulic pump by controlling a motor speed of the electric motor.

10. The work machine of claim 1, further comprising:
a machine frame;
a plurality of ground engaging units supporting the machine frame from a ground surface, wherein the primary working unit includes one or more of the ground engaging units;
wherein the engine is supported from the machine frame; and
wherein the drive train is configured to transmit power from the engine to the one or more of the ground engaging units to propel the work machine over the ground surface.

11. The work machine of claim 10, wherein:
the drive train includes a transmission, the transmission being configured to transmit power from the engine to the one or more of the ground engaging units.

12. The work machine of claim 11, further comprising:
the transmission is an electronic infinitely variable transmission.

13. The work machine of claim 11, the work machine being a wheeled loader wherein:
the hydraulically powered auxiliary working unit includes a lifting arm of the wheeled loader.

14. The work machine of claim 1, wherein the planetary gearset includes:
a sun gear, the electric motor being connected to the sun gear to define the second power input;
a plurality of planet gears connected to a carrier, the planet gears engaging the sun gear and movable about the sun gear, the engine being connected to the carrier to define the first power input; and
a ring gear surrounding the planet gears and engaging the planet gears, the ring gear being connected to the hydraulic pump to define the power output.

15. The work machine of claim 1, wherein:
the engine and the electric motor are configured such that a maximum value of the first power input from the engine is greater than a maximum value of the second power input from the electric motor.

16. A method of operating a work machine, the work machine including an engine, a primary working unit, a drive train configured to transmit power from the engine to the primary working unit, at least one hydraulically powered auxiliary working unit, a hydraulic pump configured to power the at least one hydraulically powered auxiliary working unit, and an electric motor, the method comprising steps of:
providing a first power input to a planetary gear set with the engine;
providing a second power input to the planetary gear set with the electric motor; and
summing the first power input and the second power input with the planetary gear set and providing a power output from the planetary gear set to the hydraulic pump.

17. The method of claim 16, further comprising:
controlling a pump speed of the hydraulic pump by controlling a motor speed of the electric motor.

18. The method of claim 17, wherein:
the controlling step is performed by an automatic controller.
19. The method of claim 16, further comprising:
generating electric power with an electrical generator driven by the drive train; and
providing the electric power from the electrical generator to the electric motor.
20. The method of claim 16, further comprising:
providing electric power to the electric motor from a battery carried by the work machine.

\* \* \* \* \*